US006897766B2

(12) United States Patent
Mandai et al.

(10) Patent No.: US 6,897,766 B2
(45) Date of Patent: May 24, 2005

(54) VIBRATOR CONTROLLING CIRCUIT

(75) Inventors: Tadao Mandai, Gunma (JP); Kenji Ikeda, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 460 days.

(21) Appl. No.: 10/032,936

(22) Filed: Dec. 27, 2001

(65) Prior Publication Data

US 2002/0082056 A1 Jun. 27, 2002

(30) Foreign Application Priority Data

Dec. 27, 2000 (JP) ....................................... 2000-397717
Apr. 9, 2001 (JP) ....................................... 2001-109557

(51) Int. Cl.[7] .................................................. H04B 3/36

(52) U.S. Cl. ............................... 340/407.1; 340/384.7; 340/7.6; 379/52

(58) Field of Search .............................. 340/407.1, 7.6, 340/388.1, 384.5, 384.6, 384.7, 384.71, 384.73, 9.65; 310/81; 318/118, 128; 379/52; 368/243

(56) References Cited

U.S. PATENT DOCUMENTS 4,395,665 A * 7/1983 Buchas ....................... 318/114
5,436,622 A * 7/1995 Gutman et al. .............. 340/7.6
5,682,132 A * 10/1997 Hiroyoshi et al. ........ 340/407.1
5,936,516 A * 8/1999 Narea et al. ................ 375/225
6,057,753 A * 5/2000 Myers ...................... 340/407.1
6,650,232 B1 * 11/2003 Strohbeck et al. ....... 340/384.7

OTHER PUBLICATIONS

European Search Report dated Apr. 3, 2003.

* cited by examiner

*Primary Examiner*—Jeffery Hofsass
*Assistant Examiner*—Eric Blount
(74) *Attorney, Agent, or Firm*—Fish & Richardson P.C.

(57) ABSTRACT

This invention includes a square wave signal generating circuit 20 for generating a square wave signal whose frequency changes; a MOS transistor 12 which is turned on/off on the basis of the square wave signal to supply a driving current to a vibrator 14; and a frequency shift detecting circuit 24 for detecting a frequency shift between the square wave signal from the square wave generating circuit and a resonance frequency of the vibrator. The shift in the frequency generated by the square wave generating circuit is trimmed by a signal detected by the frequency shift detecting circuit.

8 Claims, 6 Drawing Sheets

VIBRATOR CONTROLLING CIRCUIT

BACKGROUND OF THE INVENTION

1. Field of the Invention

This invention relates to a vibrator controlling circuit which is used to inform a user of alert (or arrival of a ringing signal) in a portable telephone.

2. Description of the Related Art

In the portable telephone, generally, ringing sound is generated to inform the user of alert. However, the calling sound gives others annoyance during a meeting or within a train. Therefore, recently, a vibrator is vibrated to inform the user of the alert.

Conventionally, the vibrator was vibrated by rotating a motor. However, strong demand of miniaturization and weight reduction has led to demand of vibrating the vibrator without using the motor.

FIG. 9 shows a vibrator controlling circuit for vibrating a vibrator without using a motor. In operation, when a ringing signal is received by an antenna 1, a ringing signal detecting circuit 2 detects the ringing signal to turn on a switch 3. Thus, a power supply voltage VCC is supplied to a signal generating circuit 4. Then, the signal generating circuit 4 starts to operate and generates a square wave signal at a frequency of about 240 Hz to be supplied to the gate of a MOS transistor. When the square wave signal is applied to the MOS transistor 5, the MOS transistor 5 is turned on or off. In this way, the power supply voltage VCC is intermittently supplied to the vibrator 6 to vibrate it, thereby informing a user of alert.

As described above, in the above vibrator controlling circuit, when the ringing signal is received by the antenna, the signal generating circuit generates a signal to turn on or off the MOS transistor 5. Thus, the power supply voltage VCC is intermittently supplied to the vibrator 6 to vibrate it, thereby informing a user of alert. In this case, for example, owing to slippage of a weight attached to the vibrator, if a frequency shift occurs between the resonance frequency of the vibrator and the frequency of the square wave signal generated by the signal generating circuit, as the case may be, the vibration of the vibrator stopped or weakened.

SUMMARY OF THE INVENTION

This invention provides a vibrator controlling circuit comprising: a square wave generating circuit for generating a square wave signal whose frequency changes according to the value of a voltage applied to a controlling terminal; a MOS transistor which is turned on/off on the basis of the square wave signal to supply a driving current to a vibrator; and a frequency shift detecting circuit for detecting a frequency shift between the square wave signal from the square wave generating circuit and a resonance frequency of the vibrator, wherein a shift in the frequency generated by the square wave generating circuit is trimmed by a signal detected by the frequency shift detecting circuit.

This invention provides a vibrator controlling circuit, wherein the frequency shift detecting circuit includes a first switching element for switching a vibrating wave signal from the vibrator; an operational amplifier with one input terminal supplied with a signal passed the first switching element and the other terminal supplied with a vibrating wave signal as it is; and a second switching element for passing an output signal from the operational amplifier to be supplied to a CTL terminal of the square wave generating circuit, and where in the first switching element is ON during 0–40% of the square wave signal, the second switching element is ON during 40–100% of the square wave signal, and 0–40% and 40%–100% of the vibrating wave signal are compared with each other.

DESCRIPTION OF THE PREFERRED EMBODIMENTS

Now referring to FIGS. 1 to 11, an explanation will be given of embodiments of the invention.

Figure 1:
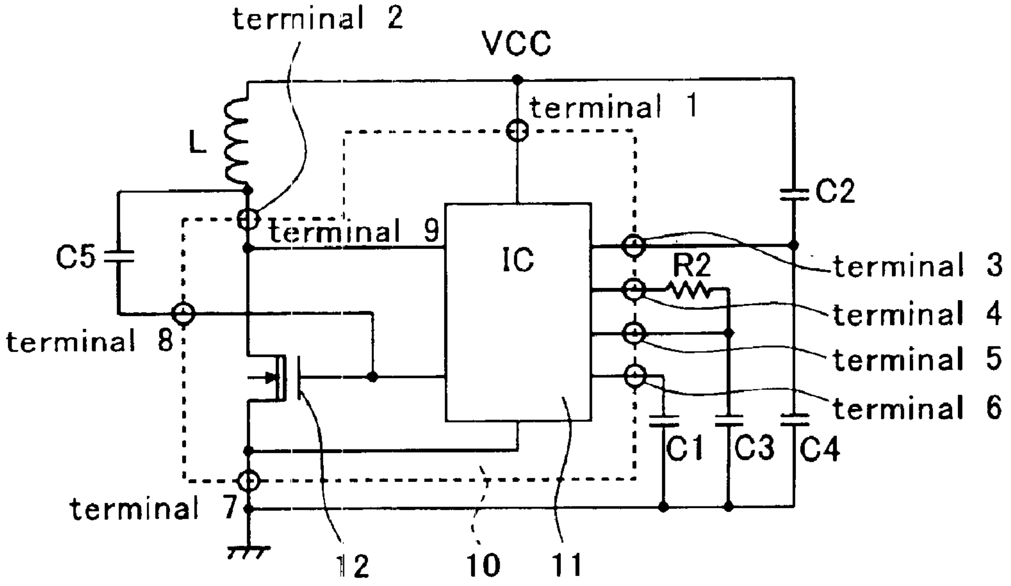
FIG. 1 is a block diagram of a vibrator controlling circuit according to this invention.

FIG. 1 is a block diagram of a vibrator controlling circuit according to this invention. The vibrator controlling circuit 10 includes a controlling integrated circuit 11 and a MOS transistor 12 which is controlled by it. The controlling integrated circuit 11 includes a square wave generating circuit which generates a square wave signal whose generated frequency varies according to the value of an applied voltage and a frequency shift detecting circuit for detecting a shift in the vibrating frequency between the square wave generating circuit and the vibrator.

A terminal 1 of the controlling integrated circuit 11 is supplied with a power supply voltage VCC, and a coil L of the vibrator 14 is connected between the terminals 1 and 2. A terminal 3 is connected to capacitors C2 and C4. Terminals 4 and 5 are connected to a resistor R2 and a capacitor C3 which define the generated frequency of the square wave generating circuit. A terminal 6 is connected to a capacitor C1. A terminal 7 is connected to ground. A capacitor C5 is connected between terminals 2 and 8.

Figure 2:
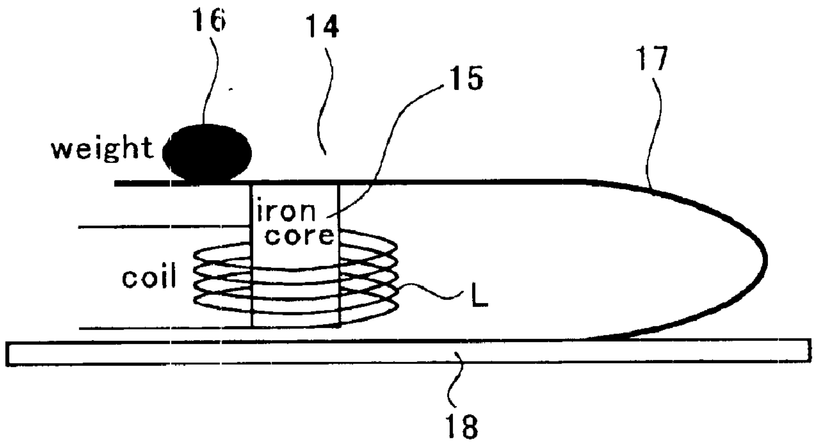
FIG. 2 is a model view of a vibrator employed in the vibrator controlling circuit according to this invention.

As shown in FIG. 2, the vibrator 14 includes an iron core 15, a flat spring 17 equipped with the iron core 15 and a weight 16, and a coil L wound around the iron core 15. The one end of the flat spring 17 is fixed to a base 18.

When a received ringing signal is detected by a ringing signal detecting circuit (not shown), a power supply voltage VCC is applied to the vibrator control circuit 10. Then, the square wave generating circuit in the controlling integrated circuit 11 starts to operate and generates a square wave generating signal at 120 Hz (duty of 50%). When the square wave signal taken out from the above controlling integrated circuit 11 is applied to the gate of the MOS transistor 12, the MOS transistor 12 is turned on or off.

When the MOS transistor 12 is turned on, the power supply voltage VCC is supplied to the coil L of the vibrator 14 so that a magnetic field is generated to attract the flat spring 17. When the MOS transistor 12 is turned off, the flat spring 17 is restored to the original state because of elastic force. By repetition of such an operation, the weight 16 which is disposed on the flat spring 17 vibrates to inform the user of an arrival of a ringing signal.

Meanwhile, the resonance frequency of the vibrator 14 is about 240 Hz. This resonance frequency varies according to dispersion of elements such as the flat spring 17 or using condition such as using the portable telephone set up or lying down. If the frequency of the square wave signal taken out from the square wave generating circuit of the controlling circuit integrated circuit 11 remains 240 Hz although the resonance frequency of the vibrator 14 has varied, the vibrator 14 weakens or sometimes stops in vibration.

In order to obviate such an inconvenience, in accordance with this invention, the frequency shift detecting circuit in the controlling integrated circuit 11 detects a frequency shift between the square wave signal taken out from the square wave generating circuit and the vibrator 14. Using the detected signal, the frequency of the square wave generating circuit is trimmed to the resonance frequency of the resonator 14 so that the vibrator 14 is vibrated sufficiently.

Figure 3:
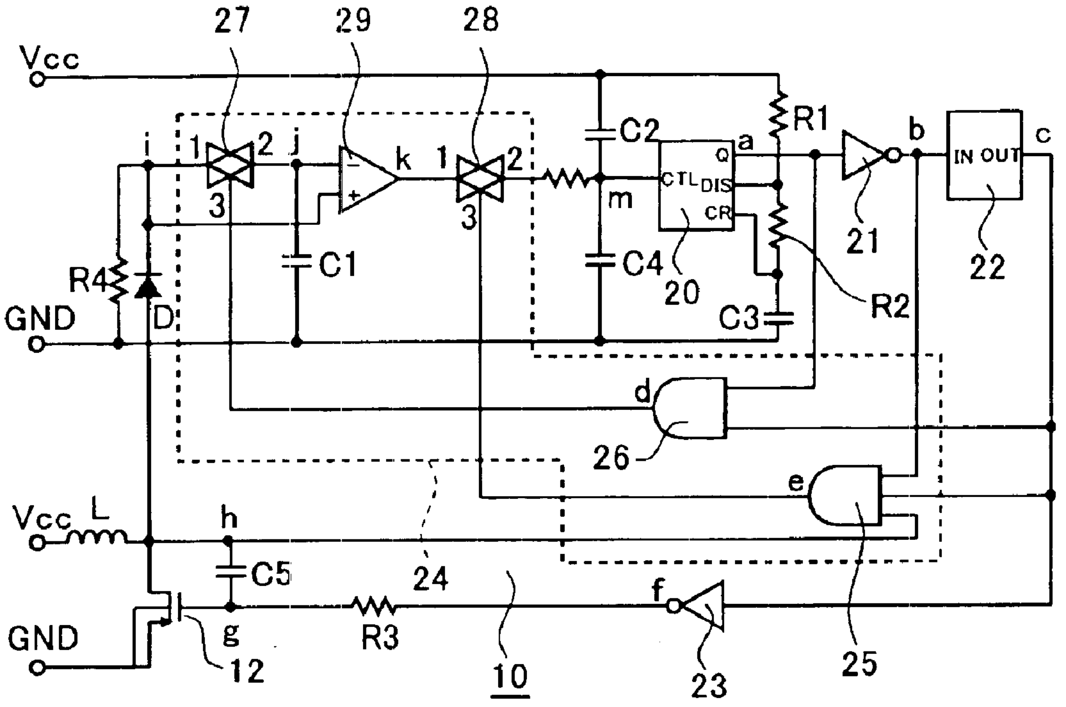
FIG. 3 is a block diagram of the vibrator controlling circuit according to this invention.

FIG. 3 is a detailed block diagram of the vibrator controlling circuit 10. A square wave signal generating circuit generates a square wave signal whose frequency and duty is determined by resistors R1 and R2 connected to a terminal DIS and a capacitor C3 connected to a terminal CR. In this embodiment, the square wave signal at 240 Hz with duty of 40% is generated. The potential at the input control terminal CTL of the square wave signal generating circuit 20 is generally set at VCC/2. However, if the potential is set on the side of VCC, the square wave signal has a frequency lower than 240 Hz, whereas if the potential is set on the side of GND, the square wave signal has a frequency higher than 240 Hz.

An inverter 21 inverts the square wave signal taken out from the terminal Q of the square wave signal generating circuit 20. A half-divider 22 half-divides the square signal inverted by the inverter 21 to provide the square wave signal at 120 Hz with duty of 50%. The square wave signal taken out from the half-divider 22 is applied to the gate of the MOS transistor 12 via an inverter 23. It should be noted that a capacitor C5 and a resistor R3 are inserted in order to prevent the ringing of the MOS transistor 12.

Figure 4:
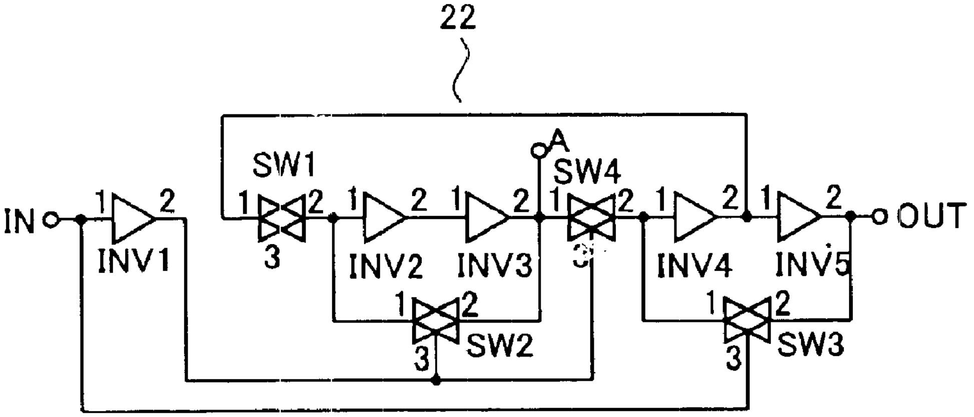
FIG. 4 is a block diagram of a half-divider employed in the vibrator controlling circuit according to this invention.

FIG. 4 is a block diagram of the half-divider 22. The half-divider 22 has an input terminal IN to which the square wave signal at 240 Hz inverted by the inverter 21 is applied and an output terminal OUT from which the converted square wave signal at 120 Hz is taken out. There are inverters INV1, INV2, INV3, INV4, INV5 and switching elements SW1, SW2, SW3 and SW4 which are connected between the input terminal IN and the output terminal OUT.

When the input terminal IN is at "H" (high) level, the switching elements SW1 and SW4 are "ON", and the switching elements SW2 and SW3 are "OFF". In contrast, when the input terminal IN is at "L" (low) level, the switching elements SW1 and SW4 are OFF, and the switching elements SW2 and SW3 are "ON".

First, when the input terminals IN and output terminal OUT both are at "H" level, because the switching element SW1 is ON, point A is at "L" level opposite to the output terminal OUT. When the input terminal IN becomes "L" level, the switching element SW1 turns off and the switching element SW2 turns on so that the point A remains at "L" level. When the input terminal IN becomes "H" level again, the switching element SW1 turns on and switching element SW2 turns off so that the point A becomes "H" level. However, since the switching element SW3 turns off and the switching element SW4 turns on so that the output terminal OUT remains at "L" level. In this way, the level at the output terminal OUT changes whenever the input terminal IN falls from "H" level into "L" level. Therefore, the square wave signal at 240 Hz applied to the input terminal IN is divided to generate the square wave signal at 120 Hz from the output terminal OUT.

The frequency shift detecting circuit 24 includes an AND circuit 25, an AND circuit 26, a first switching element 27, a second switching element 28 and an operational amplifier 29. The input terminals of the AND circuit 25 are connected to an output terminal of said inverter 21, an output terminal of the half-divider 22 and the one end of the coil L, whereas the output terminal thereof is connected to the terminal 3 of the second switching element 28. The input terminals of the AND circuit 26 are connected to the input terminal of the inverter 21 and output terminal of the half-divider 22, whereas the output terminal thereof is connected to the terminal 3 of the first switching element 27.

The terminal (−) of the operational amplifier 29 is connected to the coil L through the first switching element and 27 a diode D, whereas the terminal (+) thereof is connected to the coil L through the diode D. The output terminal of the operational amplifier 29 is connected to the control terminal CTL of the square wave signal generating circuit 20 through the second switching element 28.

Figure 5:
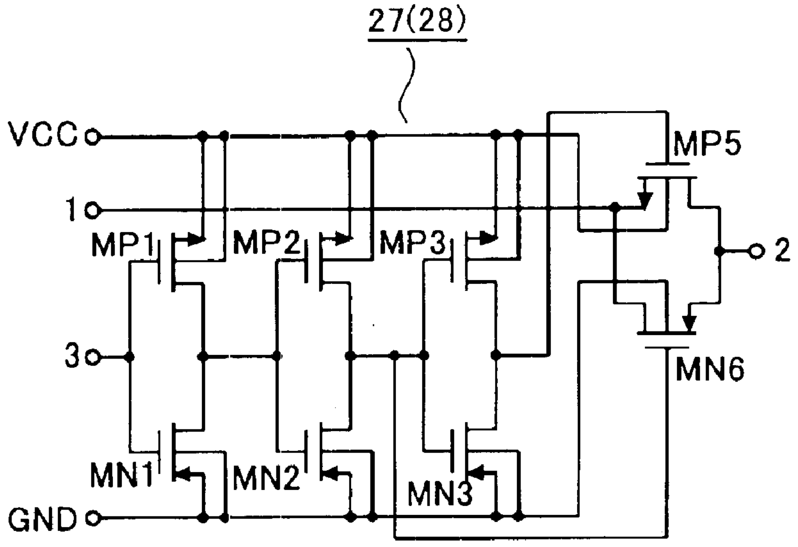
FIG. 5 is a circuit diagram of a switching element employed in the vibrator controlling circuit according to this invention.

FIG. 5 is a block diagram of the first switching element 27 and second switching element 28. The first switching element includes P channel MOS transistors MP1, MP2, MP3, MP5 and N channel MOS transistors MN1, MN2, MN3 and MN6. In operation, when the terminal 3 becomes "H" level, the gate of the MOS transistor MN6 becomes "H" level and the gate of the MOS transistor MP5 becomes "L" level. Therefore, both the MOS transistors MN6 and MP5 turn on, so that low resistance is given between the terminals 1 and 2.

On the other hand, when the terminal 3 becomes "L" level, the gate of the MOS transistor MN6 becomes "L" level and the gate of the MOS transistor MP5 becomes "H" level. Therefore, both the MOS transistors MN6 and MP5 turn off, so that high resistance is given between the terminals 1 and 2.

Figure 6:
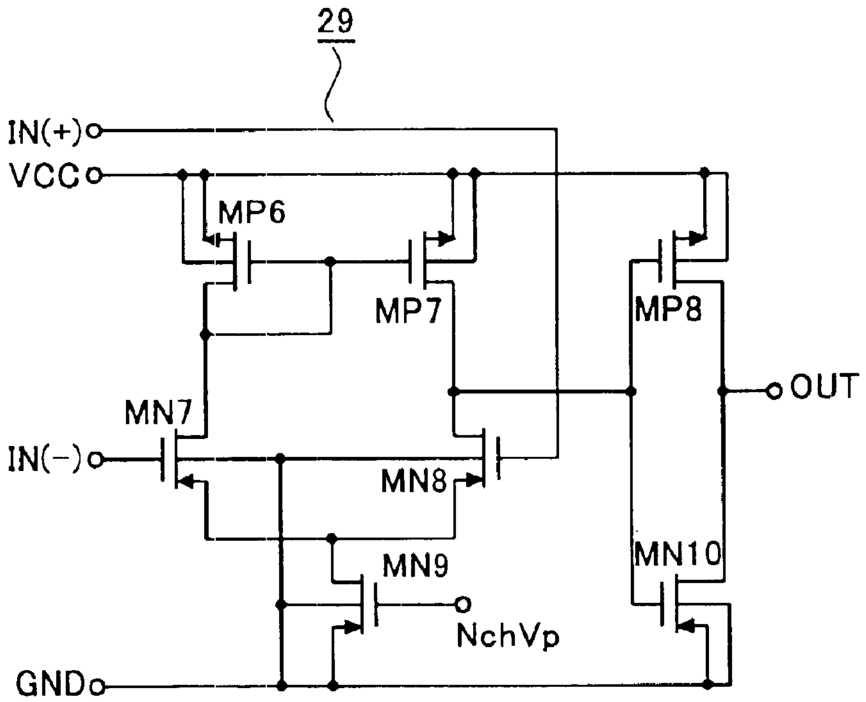
FIG. 6 is a circuit diagram of an operational amplifier employed in the vibrator controlling circuit according to this invention.

FIG. 6 is a block diagram of the operational amplifier 29. The operational amplifier 29 includes P channel MOS transistors MP6, MP7, MP8 and N channel MOS transistors MN7, MN8, MN9 and MN10. In operation, when the input terminal IN (+) is larger than the input terminal IN (−), the output terminal OUT provides VCC. When the input terminal IN (−) is larger than the input terminal IN (+), the output terminal provides GND.

Figure 7:
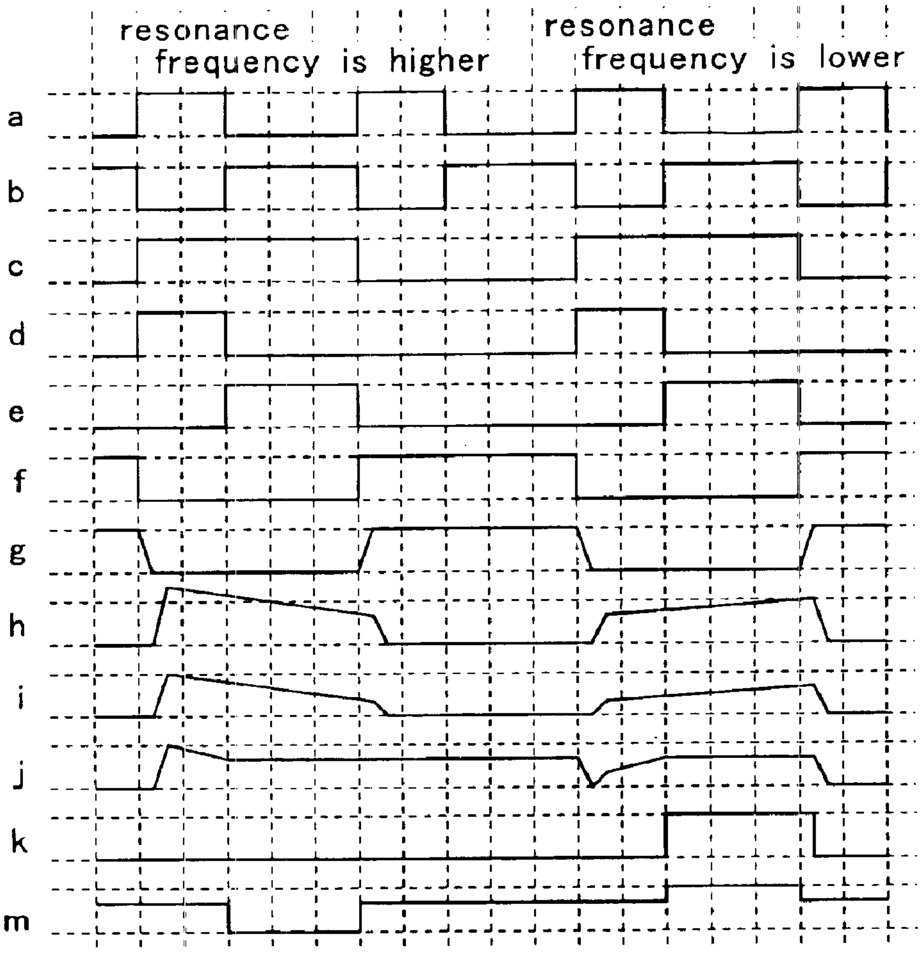
FIG. 7 is a signal waveform chart of each of various positions in the vibrator controlling circuit according to this invention.

FIG. 7 is a waveform chart showing the operation of the vibrator controlling circuit 10. When the power supply voltage VCC is supplied to the vibrator controlling circuit 10 in response to the ringing signal, a square wave signal a at 240 Hz (with on duty of 40%) is generated from the square wave signal generating circuit 20. The square wave signal is inverted by the inverter 21 to provide a square wave signal b. The square wave signal b is applied to the input terminal IN of the half-divider 22.

In the half-divider 22, as described above, since the level at the output terminal OUT changes whenever the square wave signal applied to the input terminal IN falls from "H" level to "L" level, the square wave signal b is divided into the square wave signal c at 120 Hz (with on-duty of 50%)

The square wave signal c at 120 Hz is inverted into a square wave signal f by the inverter 23. Further, a driving waveform g is applied to the gate of the MOS transistor 12 through the capacitor C5 and resistor R3 for preventing ringing. Thus, the MOS transistor 12 repeats ON and OFF.

When the MOS transistor 12 is turned on, the power supply voltage VCC is supplied to the coil L of the vibrator 14, so that a magnetic field is generated to attract the flat spring 17. When the MOS transistor 12 is turned off, the flat spring 17 is restored to the original state because of elastic force. Thus, when the MOS transistor 12 is turned on again, the power supply voltage VCC is supplied to the coil L of the vibrator 14 so that the magnetic field is generated, thereby attracting the flat spring 17. By repetition of such an operation, the weight 16 vibrates to inform the user of arrival of the ringing signal.

The driving waveform g is applied to the input terminal 1 of the first switching element 27 as a waveform i through the diode D. At this time, the terminal 3 of the first switching element 27 is supplied with the square wave signals a and c through the AND circuit 26. Therefore, the input terminal (−) of the operational amplifier 29 is supplied with a waveform j of 0–40% of the driving waveform i through the first switching element 27, whereas the input terminal (+) of the operational amplifier 29 is supplied with the potential of the driving wave form i as it is.

Thus, a waveform k is produced from the output of the operational amplifier 29 and is applied to the second switching element 28. The AND-ed signal of the square waveform b, square waveform c and driving waveform h is applied to the terminal 3 of the switching element 28. Therefore, the second switching element 28 transmits 40–100% of the waveform k. Thus, a waveform m is supplied to the control terminal CTL of the square wave signal generating circuit 20.

Figure 8:
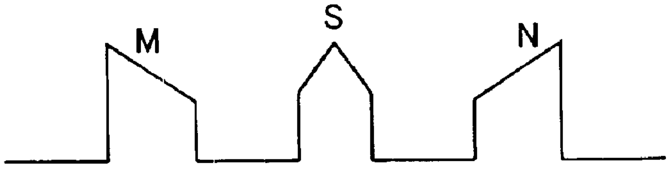
FIG. 8 is a driving signal waveform chart of a vibrator employed in the vibrator controlling circuit according to this invention.

FIG. 8 shows a vibrating waveform signal of the vibrator 14. Where the resonance frequency of the vibrator 14 is higher than the driving frequency of the driving waveform, a driving waveform M on the left side is generated. Where the former is equal to the latter, a driving waveform S, shown at the center, is generated. Further, where the former is lower than the latter, a driving waveform N on the right side is generated. By comparing the potential of 0–40% of the square waveform of the vibrator 14 with the subsequent potential, a frequency shift between the resonance frequency and the driving frequency is trimmed.

Assuming that the resonance frequency of the vibrator 14 is lower than the driving frequency, the waveform N is generated, so that in 0–40% of the square waveform, the input terminal (−) of the operational amplifier 29 is equal to the input terminal (+) thereof. Thus, the output terminal of the operational amplifier 29 is at "L" level. In 40%–100% of the square waveform, the input terminal (+) is higher than the input terminal (−) so that the output signal from the operational amplifier 29 is at "H" level. On the other hand, the AND-ed signal of the square waveform b, square waveform c and driving waveform h is applied to the terminal 3 of the switching element 28, so that the second switching element 28 transmits the waveform m which is 40–100% of the waveform k. Therefore, the potential between the capacitors C2 and C4 (the potential at the junction where C2 and C4 are connected to each other) which has been initially VCC/2 is shifted to a high potential side. Then, the potential at the control terminal CTL of the square waveform signal generating circuit 20 is raised, so that the frequency of the generated signal is shifted from 240 Hz to a low frequency.

Inversely, where the resonance frequency of the vibrator 14 is higher than the driving frequency, the waveform M is generated, so that in 0–40% of the square waveform, the input terminal (−) of the operational amplifier 29 is equal to the input terminal (+) thereof. Thus, the output terminal of the operational amplifier 29 is at "L" level. In 40%–100% of the square waveform also, the level of the waveform j is held by the capacitor C1. Therefore, the input terminal (−) is higher than the input terminal (+), so that the output signal from the operational amplifier 29 is at "L" level.

On the other hand, the AND-ed signal of the square waveform b, square waveform c and driving signal h is applied to the terminal 3 of the switching element 28, so that the second switching element 28 transmits the L level signal which is 40–100% of the waveform k. Therefore, the potential between the capacitors C2 and C4 which has been initially VCC/2 is shifted to the side of GND.

Then, the potential at the control terminal CTL of the square wave signal generating circuit 20 is lowered, so that the frequency of the generated signal is shifted from 240 Hz to a higher frequency.

In this way, the frequency of the signal generated from the square wave signal generating circuit 20 so that the square waveform signal at the resonance frequency is applied to the coil L of the vibrator 14.

Figure 9:
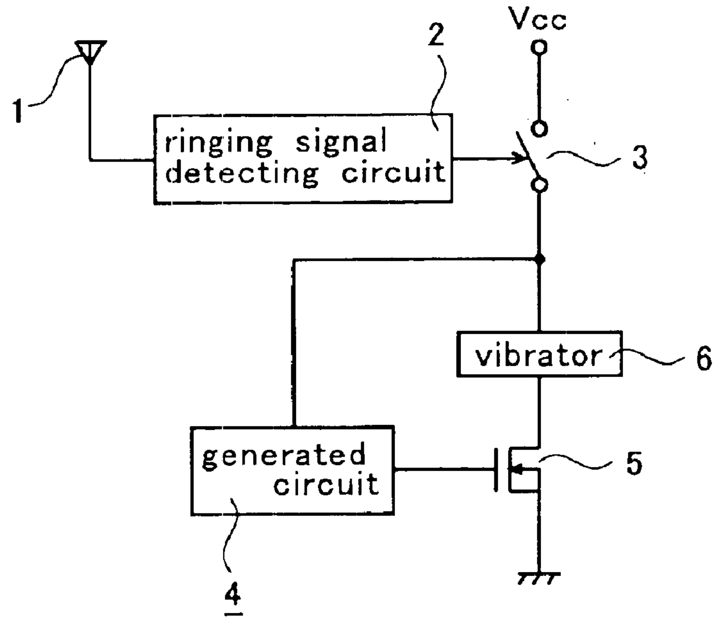
FIG. 9 is a block diagram of a conventional vibrator controlling circuit.

In addition to the above, as shown in previously referenced FIG. 9, conventionally, the generating circuit 4 is turned on to operate by the switch 3 which is connected to a power supply and turned on by a detected signal detected at the ringing detecting circuit 2 when a ringing signal is received by the antenna 1. By operating the generating circuit 4, the MOS transistor 5 is turned on or off. In this way, the power supply voltage VCC is intermittently supplied to the vibrator 6 to vibrate it, thereby informing a user of alert. Thus, in a conventional vibrator controlling circuit, the ringing signal detecting circuit detects the ringing signal and turns on the switch 3 which is connected to a power supply circuit, so that a power switch is required and it further must have a large current capacity since a current from the power supply runs through the switch 3.

Figure 10:
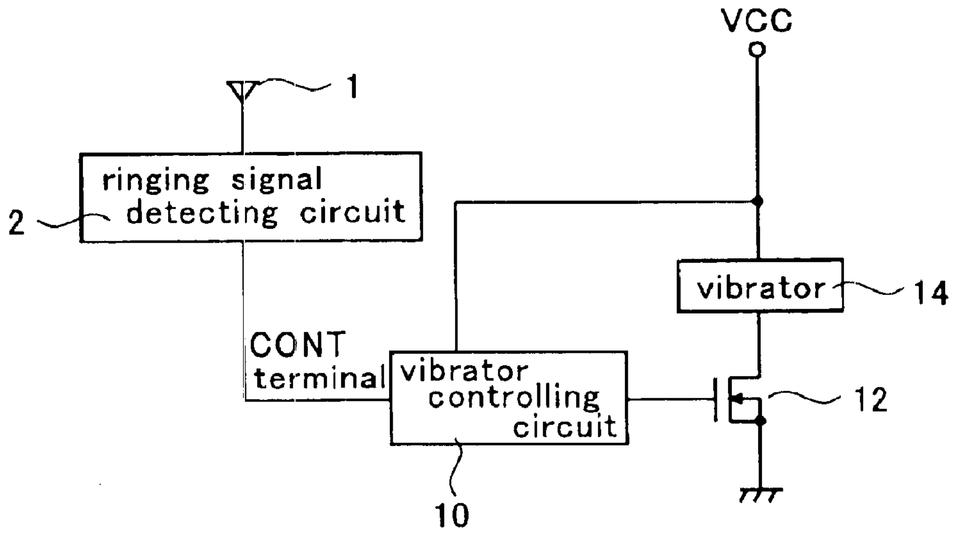
FIG. 10 is a block diagram of another embodiment of a vibrator controlling circuit according to this invention.

And so, as shown in FIG. 10, a CONT terminal is installed in said vibrator controlling circuit 10. And a CONT signal, which is changed from "L" level (or "H" level) to "H" level (or "L" level if previously at "L" level) upon a reception of a ringing signal at the ringing signal detecting circuit 2, is applied to said CONT terminal. When said CONT signal is changed to "H" level (or to "L" level), said vibrator controlling circuit is operated to generate a square wave signal of 120 Hz. The MOS transistor 12 is turned on or off with the square wave signal of 120 Hz to vibrate the vibrator 14, so that said power switch is made unnecessary.

Figure 11:
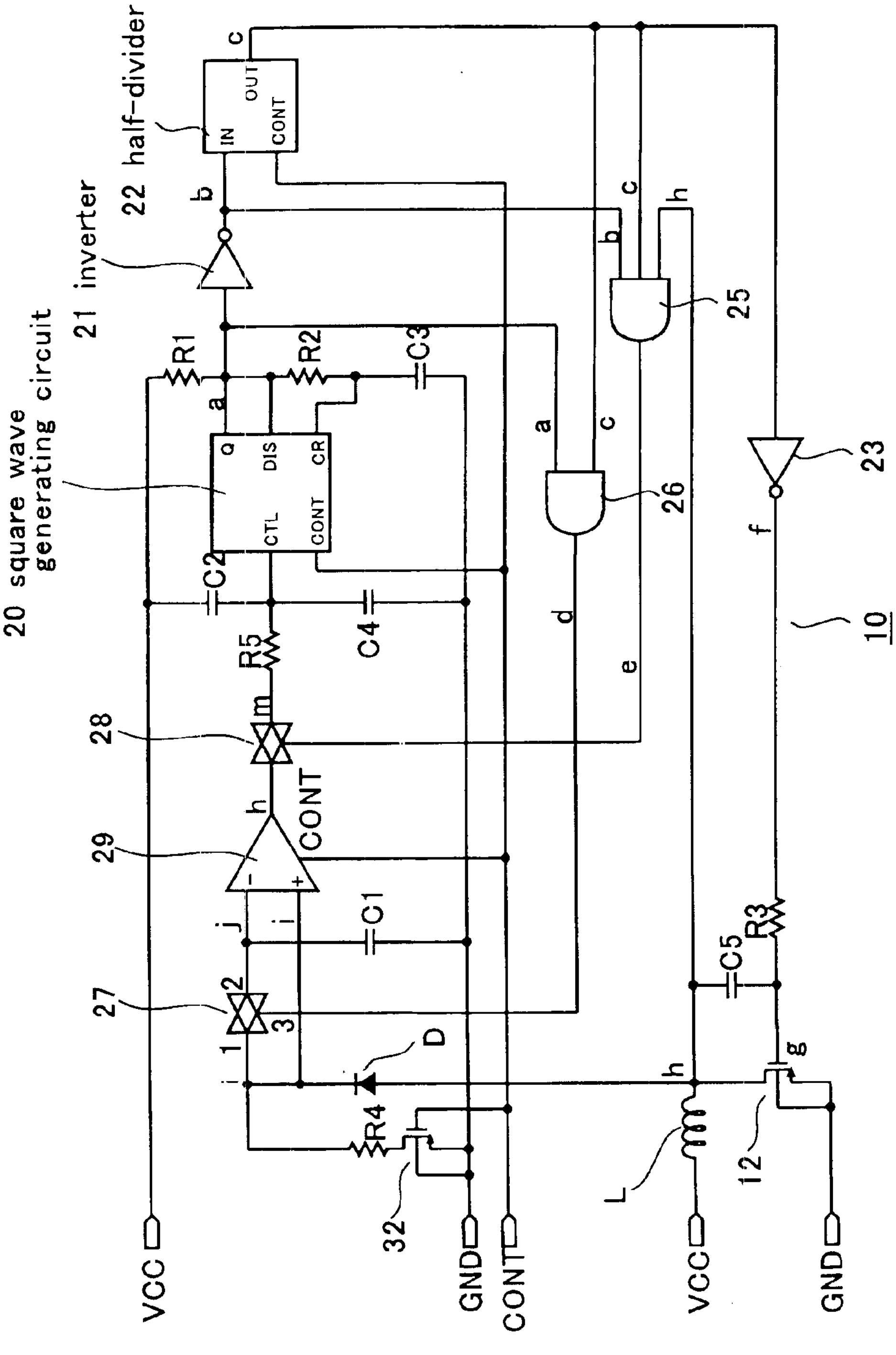
FIG. 11 is a detailed block diagram of another embodiment of a vibrator controlling circuit according to this invention.

In more detail, as shown in FIG. 11, CONT terminals are installed to the square wave generating circuit 20, the half-divider 22 and operational amplifier 29, respectively. When a ringing signal is not received, said CONT signal detected from said ringing signal detecting circuit 2 is at "L"

level, so that the CONT terminals of said square wave generating circuit 20, the half-divider 22 and the operational amplifier 29 are set to "L" level. Because of that, even when a power supply voltage is applied to the vibrator controlling circuit 10, all of a terminal Q, a terminal DIS and a terminal CR of said square wave generating circuit 20 are fixed to "H" level. Also, a terminal OUT of the half-divider 22 is fixed to "H" level, while an output terminal of the operational amplifier 29 is fixed to "L" level.

When the terminals of said square wave generating circuit 20, such as the terminal Q, are fixed to "H" level and the terminal OUT of the half-divider 22, too, is fixed to "H" level, a gate voltage which is applied to the gate electrode of the MOS transistor 12 through the inverter 23 is always at "L" level, so that said MOS transistor 12 stays turned off. Accordingly, a driving waveform f is not applied to a coil L of the vibrator 14, so that the vibrator 14 does not vibrate.

Further, when the CONT signal, applied to said CONT terminal, is at "L" level, the MOS transistor 32 which is connected between the switching circuit 27 and the ground is switched off to stop the flow of the wasteful current between the switching circuit 27 and the ground.

Assuming that a ringing signal is received and detected at the ringing signal detecting circuit 2 now, the CONT signal, which is supplied by said ringing signal detecting circuit 2 and applied to the CONT terminal of the vibrator controlling circuit 10, becomes "H" level. If the CONT signal, which is applied to the CONT terminal of the vibrator controlling circuit 10, becomes "H" level, the CONT terminals of said square wave generating circuit 20, half-divider 22 and operational amplifier 29 become "H" level as well, and turns to a normal operation status.

When said square wave generating circuit 20, the half-divider 22 and the operational amplifier 31 are operated normally, a square wave signal a of 240 Hz is generated and outputted from a terminal Q of the square wave generating circuit 20, as described earlier. Said square wave signal a is half-divided into a square wave signal c of 120 Hz (duty 50%) by the half-divider 22.

Said square wave signal c of 120 Hz is inverted to a square wave switching signal f by an inverter 23, and said signal f goes through a capacitor C5 and a resistor R3 to suppress a ringing, and then is applied to the gate of the MOS transistor 12 as a driving waveform g. Thus said MOS transistor 12 repeats switching on and off.

At the same time, an operational amplifier 29 of a frequency shift detecting circuit, too, is in an operation status. Accordingly, said driving waveform g, after passing through a diode D, is applied to an input terminal (−) of the operational amplifier 29, and at the same time is applied to an input terminal (+) of the operational amplifier 29 directly after passing the diode D. Thus, in a similar manner as described earlier, a frequency shift detection signal is detected, and a frequency shift of square wave signal generation is adjusted.

The vibrator controlling circuit according to this invention includes a square wave generating circuit for generating a square wave signal whose frequency changes according to the value of a voltage applied to a controlling terminal; a MOS transistor which is turned on/off on the basis of said square wave controlling signal to supply a driving current to a vibrator; and a frequency shift detecting circuit for detecting a shift between the square wave signal of said square wave generating circuit and a resonance frequency of said vibrator. A shift in the frequency generated by said square wave generating circuit is trimmed by a signal detected by said frequency shift detecting circuit. In this way, the shift between the resonance frequency of the vibrator and the frequency of the square waveform is always trimmed so that the vibrator can be vibrated sufficiently to inform the user of arrival of a ringing signal.

What is claimed is:

1. A vibrator controlling circuit comprising:

a square wave generating circuit for generating a square wave signal whose frequency changes according to the value of a voltage applied to a controlling terminal;

a switching element which is turned on/off on the basis of said square wave signal to supply a driving current to a vibrator; and a frequency shift detecting circuit for detecting a frequency shift between the square wave signal from said square wave generating circuit and a resonance frequency of said vibrator, wherein a shift in the frequency generated by said square wave generating circuit is trimmed by a signal detected by said frequency shift detecting circuit.

2. A vibrator controlling circuit according to claim 1, wherein the square wave signal generated by said square wave generating circuit is divided by a half-divider and the divided signal is applied to said switching element.

3. A vibrator controlling circuit comprising:

a square wave generating circuit for generating a square wave signal whose frequency changes according to the value of a voltage applied to a controlling terminal:

a switching element which is turned on/off on the basis of said square wave signal to supply a driving current to a vibrator; and a frequency shift detecting circuit for detecting a frequency shift between the square wave signal from said square wave generating circuit and a resonance frequency of said vibrator, wherein a shift in the frequency generated by said square wave generating circuit is trimmed by a signal detected by said frequency shift detecting circuit, and wherein said frequency shift detecting circuit includes a first switching element for switching a vibrating wave signal from said vibrator; an operational amplifier with the one input terminal supplied with a signal passed said first switching element and the other terminal supplied with the vibrating wave signal as it is; and a second switching element for passing an output signal from said operational amplifier to be supplied to a control (CTL) terminal of said square wave generating circuit.

4. A vibrator controlling circuit according to claim 3, wherein said first switching element is ON during 0–40% of said square wave signal, said second switching element is ON during 40–100% of said square wave signal, and 0–40% and 40%–100% of said vibrating wave signal are compared with each other.

5. A vibrator controlling circuit according to claim 1, wherein said square wave generating circuit, switching element and frequency shift detecting circuit are constructed of a single chip.

6. A vibrator controlling circuit according to claim 1, wherein said square wave generating circuit further comprises a control (CONT) terminal, a CONT signal supplied to the CONT terminal turns on the square wave generating circuit when the CONT signal changes from a first level to a second level upon a detection of a ringing signal.

7. A vibrator controlling circuit comprising:

a square wave generating circuit for generating a square wave signal whose frequency changes according to the value of a voltage applied to a controlling terminal;

a switching element which is turned on/off on the basis of said square wave signal to supply a driving current to a vibrator; and a frequency shift detecting circuit for detecting a frequency shift between the square wave signal from said square wave generating circuit and a resonance frequency of said vibrator, wherein:

a shift in the frequency generated by said square wave generating circuit is trimmed by a signal detected by said frequency shift detecting circuit, the square wave signal generated by said square wave generating circuit is divided by a half-divider and the divided signal is applied to said switching element, and said half-divider further comprises a control (CONT) terminal, a CONT signal supplied to the CONT terminal turns on the half-divider when the CONT signal changes from a first level to a second level upon a detection of a ringing signal.

8. A vibrator controlling circuit according to claim 3, wherein said operational amplifier in said frequency shift detecting circuit further comprises a control (CONT) terminal, a CONT signal supplied to the CONT terminal turns on the operational amplifier when the CONT signal changes from a first level to a second level upon a detection of a ringing signal.

* * * * *